(12) United States Patent
Campanile et al.

(10) Patent No.: US 8,655,497 B2
(45) Date of Patent: Feb. 18, 2014

(54) SYSTEM AND METHOD FOR REGULATING ELECTRICAL AND THERMAL ENERGY GENERATED BY CO/TRIGENERATION ENERGY SYSTEM IN MULTI-SOURCE ENERGY PLANT

(75) Inventors: Pasquale Campanile, Orbassano (IT); Franco Anzioso, Orbassano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 278 days.

(21) Appl. No.: 13/060,155

(22) PCT Filed: Aug. 21, 2009

(86) PCT No.: PCT/EP2009/060828
§ 371 (c)(1),
(2), (4) Date: Jun. 14, 2011

(87) PCT Pub. No.: WO2010/020689
PCT Pub. Date: Feb. 25, 2010

(65) Prior Publication Data
US 2011/0245986 A1     Oct. 6, 2011

(30) Foreign Application Priority Data

Aug. 21, 2008 (EP) .................................... 08425568

(51) Int. Cl.
*G06F 1/28* (2006.01)
(52) U.S. Cl.
USPC ............ 700/288; 700/291; 700/297; 700/286
(58) Field of Classification Search
USPC .................................. 700/288, 291, 295, 297
See application file for complete search history.

(56) References Cited

U.S. PATENT DOCUMENTS 4,628,462 A * 12/1986 Putman ......................... 700/288
5,388,033 A     2/1995 Knupp
(Continued)

FOREIGN PATENT DOCUMENTS

| DE | 10261171 | 6/2004 |
|---|---|---|
| EP | 1167698 | 1/2002 |
| WO | WO 2007/149582 | 12/2007 |

OTHER PUBLICATIONS

Tsay, Ming-Tong, "Applying the multi-objective approach for operation strategy of cogeneration systems under environmental constraints." International Journal of Electrical Power & Energy Systems, vol. 25, Issue 3 Mar. 2003. pp. 210-226.*

(Continued)

*Primary Examiner* — Mohammad Ali
*Assistant Examiner* — Emilio J Saavedra
(74) *Attorney, Agent, or Firm* — Berenato & White, LLC

(57) ABSTRACT

A method for regulating electrical and thermal power generated by an energy system in a multi-source energy plant that comprises one or more loads. The energy system comprises an electronic unit implementing a multi-objective function (Fmo) that comprises: first computation parameters (PTi, Oi) comprising values of the electrical and thermal powers exchanged within the multi-source plant between a cogeneration module, loads, auxiliary sources and an electric network; and a set of second (Ci, Ai) and third computation parameters (Ni) correlated to the costs of management and exchange of the electrical and thermal powers within the energy plant. The method comprises the step of determining optimal values (PUi) of the electrical and thermal powers that the energy system must supply to minimize the multi-objective function (Fmo), and the step of varying the electrical and thermal powers generated by the cogeneration module as a function of the optimal values calculated (PUi).

15 Claims, 2 Drawing Sheets

(56) References Cited

U.S. PATENT DOCUMENTS

| | | | |
|---|---|---|---|
| 5,432,710 A * | 7/1995 | Ishimaru et al. | 705/412 |
| 6,757,591 B2 * | 6/2004 | Kramer | 700/288 |
| 7,797,062 B2 * | 9/2010 | Discenzo et al. | 700/28 |
| 7,991,512 B2 * | 8/2011 | Chandra et al. | 700/291 |
| 2004/0098169 A1 | 5/2004 | Abe et al. | |
| 2004/0263116 A1 | 12/2004 | Doruk et al. | |
| 2006/0085363 A1 | 4/2006 | Cheng et al. | |

OTHER PUBLICATIONS

Canova, Aldo at al., "Comparative economical analysis of a small scale trigenerative plant: a case study." Industry Applications Conference, 2007. 42nd IAS Annual Meeting. IEEE Conference Publications. pp. 1456-1459.*

* cited by examiner

SYSTEM AND METHOD FOR REGULATING ELECTRICAL AND THERMAL ENERGY GENERATED BY CO/TRIGENERATION ENERGY SYSTEM IN MULTI-SOURCE ENERGY PLANT

TECHNICAL FIELD

The present invention relates to a system and a method for multi-objective management of the electrical and thermal energy generated by a co/trigeneration energy system in a multi-source energy plant.

In particular, the present invention regards a system designed to regulate in real time and, according to a strategy of multi-objective management, the production of electrical and thermal energy generated by a co/trigeneration energy system, which is structured for being fed with a flow of fuel so as to produce electrical energy and thermal energy in the form of one or more flows of fluid having different temperatures, to which the ensuing treatment will make explicit reference, without this implying any loss of generality.

BACKGROUND ART

Known to the art are systems designed to generate and distribute energy, which are provided with a plurality of distinct energy installations or plants, designated hereinafter by the term "multi-source energy plants", each of which comprises loads, one or more co/trigeneration energy systems, and a plurality of independent energy sources structured for exchange of thermal energy or electrical energy from and to the co/trigeneration energy systems themselves and/or the loads.

In particular, the energy sources typically comprise heat generators and/or generators of frigories designed to exchange flows of fluid, respectively, at high and low temperature with co/trigeneration energy systems, and static or rotary electrical generators, and/or electrical-distribution networks, and/or systems for generation of renewable energy of a photovoltaic and/or solar type capable of performing an exchange of the electrical energy with the co/trigenerator energy systems themselves.

Moreover known is the need to be able to manage in an optimal way the electrical and thermal energy exchanged between the co/trigeneration energy system and the different energy sources present within one and the same multi-source energy plant in order to obtain a maximization of the overall energy efficiency of the multi-source energy plant and at the same time enabling a reduction in the costs of production of the energy required thereby.

In the case in point, this need derives basically from the need to be able to control the co/trigeneration energy system in an intelligent way taking into account different conditions, such as, for example, the thermal and electrical requirement of the load, the cost of the fuel used by the co/trigeneration energy system, the energy costs associated to the energy sources present in the energy plant, the possible thermal and electrical accumulations of energy present in the plant, and the environmental costs regarding the quality of the air.

U.S. Pat. No. 5,388,033 A discloses a method of real time control of a plurality of power output apparatuses for providing a demanded quantity of desired output power which generally results in the generation of some undesired consequences, the undesired consequences of the combined power output apparatus being kept at or below a predetermined level. The undesired consequences include various emissions, high or inefficient costs.

EP 1,167,698 A discloses an integrated operation instructing system for operating power generation plants that is capable of operating gas turbine power generation plants in a highly efficient and economical manner.

DE 102 61 171 B3 discloses a installation having a number of combined power and heat generation plants for generation of thermal energy which is stored and generation of electrical current which is supplied to the mains current network, with detection of their remaining heat storage capacities, for selection and activation of the plants for which the heat storage capacity is not exhausted, in dependence on the current requirement.

US 2004/263116 A1 discloses an intelligent distributed energy storage system for demand side power management. It provides a system that can store electric energy close to the point of use or close to the distributed production for use when demanded by the users. These storage nodes can communicate with a central clearing entity to negotiate if the nodes should buy energy for storage, provide energy to the user above a given power level, or sell power back to the grid. The function will depend on the amount of energy stored in the node, the cost of the electric energy, the cost of the electric peak power, the price of resold electrical energy and power, plus the local usage.

DISCLOSURE OF INVENTION

Consequently, the aim of the present invention is to provide a system for multi-objective management of the electrical and thermal energy generated by a co/trigeneration energy system, which will be able to maximize the energy efficiency of one or more multi-source installations, and at the same time reduce the costs of management thereof.

According to the present invention, a system and method for regulating electrical and thermal energy produced by a co/trigeneration energy system are provided as claimed in the appended claims.

BRIEF DESCRIPTION OF THE DRAWINGS

The present invention will now be described with reference to the annexed drawings, which illustrate a non-limiting example of embodiment thereof and in which.

BEST MODE FOR CARRYING OUT THE INVENTION

Figure 1:
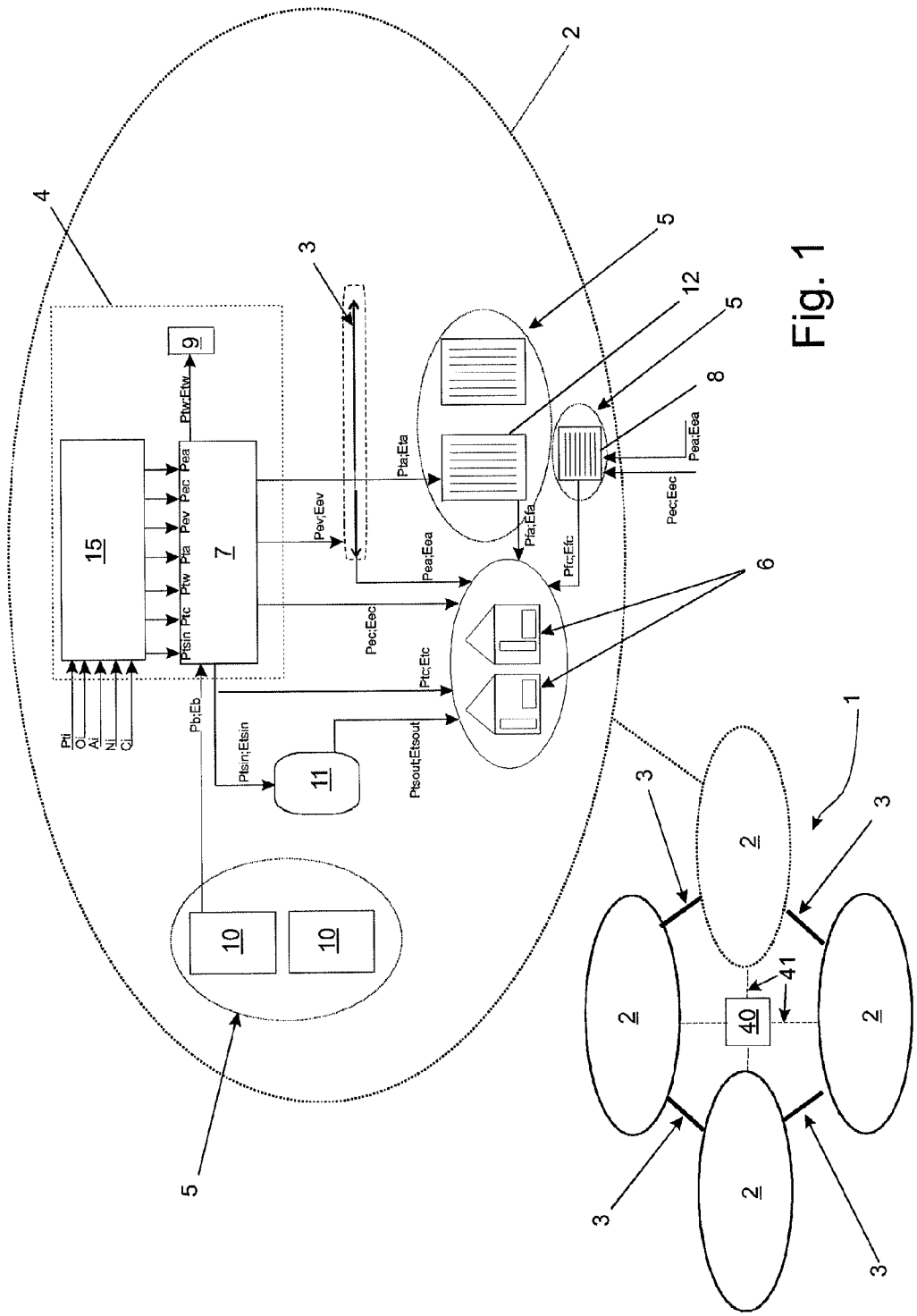
FIG. 1 is a schematic illustration of an energy plant provided with a system for performing a multi-objective management of the electrical and thermal energy produced by a co/trigeneration energy system built according to the dictates of the present invention.

With reference to FIG. 1, designated as a whole by 1 is an energy system 1 structured for generation/distribution of thermal and electrical energy to a plurality of multi-source energy installations or plants 2, which are connected to one another through an electric network 3 for performing exchanges of electrical energy, and each comprise one or more energy systems 4 (just one of which illustrated in FIG. 1 for simplicity of description); one or more energy sources 5; and one or more loads 6 designed to use the thermal energy and/or the electrical energy produced. The energy systems 4 of the present invention are cogeneration energy systems and/or trigeneration energy systems, and are hereinafter termed as co/trigeneration energy system or systems.

The co/trigeneration energy system 4 is structured for producing electrical and thermal energy, the latter in one or more usable forms, i.e., energy at high temperature usable, for example, for heating the loads 6 or for the production of steam that can be used, for example, as steam for the process, and energy at low temperature usable, for example, for conditioning the loads 6 themselves.

In particular, the co/trigeneration energy system 4 can comprise a co/trigeneration module 7, which is designed to be fed with a flow of fuel, such as, for example, methane gas, and is designed to generate electrical and thermal energy in the form of one or more flows of fluid, such as, for example, water or air, at one or more temperatures different from one another.

In detail, the co/trigeneration module 7 can generate thermal energy in the form of a flow of water at high temperature designed to heat the loads 6, and/or in the form of a flow of water or air at low temperature usable, for example, for conditioning the loads 6 themselves.

The co/trigeneration module 7 is structured for supplying at output a thermal energy Etc in the form of a flow of air or water at high temperature having an overall thermal power Ptc designed to be supplied to the loads 6.

The co/trigeneration module 7 can moreover present: an electrical output terminal that can be connected to electrical apparatuses of the loads 6 for supplying thereto an electrical energy Eec having an electrical power Pec; and an electrical output terminal for supplying to the electric network 3 an electrical energy Eev having an electrical power Pev.

The co/trigeneration energy system 4 can moreover comprise a heat-dissipator module 9, which is connected to the co/trigeneration module 7 to receive thermal energy Etw in the form of a flow of air or water at high temperature having a thermal power Ptw.

The multi-source energy plant 2 moreover comprises an integrative-cooling device 8, which is designed to receive from the cogeneration system 4 an electrical energy Eec having an electrical power Pec, and/or from the electric network 3 an electrical energy Eea having an electrical power Pea, and to supply at output a thermal energy Efc in the form of a flow of air or water at low temperature having an overall thermal power Pfc.

As regards the loads 6, they comprise electrical/thermal apparatuses and/or plants of a known type, and consequently not described in detail, which are structured so as to be able to receive and use the electrical energy and/or thermal energy.

In the case in point, the electrical apparatuses and/or plants of the loads 6 are connected to the electric network 3 in such a way as to be able to receive therefrom an electrical energy Eea having an electrical power Pea, whilst some apparatuses and/or the thermal plants, for example, for conditioning the loads, are connected to the integrative-cooling device 8 to receive therefrom the thermal energy Efc in the form of a flow of air or water at low temperature having an overall thermal power Pfc.

In the example illustrated in FIG. 1, the energy sources 5 comprise, in addition to the integrative-cooling device 8, electrical/thermal apparatuses and/or plants for the accumulation and/or supplementary generation of electrical and thermal energy within the energy plant 2, such as, for example, apparatuses for generation of renewable energy of a photovoltaic and/or solar type.

In particular, the energy sources 5 comprise: one or more boilers 10 for thermal integration designed to supply thermal energy Eb to the co-generator module 7 in the form of a flow of air or water at high temperature having an overall thermal power Pb; and a heat-accumulation device 11, for example, a tank, which is structured to receive at input from the co/trigenerator module 7 a thermal energy Etsin in the form of a flow of air or water at high temperature having an overall thermal power Ptsin, and supplies at output to the loads 6 a thermal energy Etsout in the form of a flow of air or water at high temperature having an overall thermal power Ptout.

The energy sources 5 moreover comprise one or more thermally activated refrigeration devices 12, which are structured to receive from the co-generator module 7 a flow of air or water at low temperature having an overall thermal power Pta and to supply at output to the loads 6 a thermal energy Efa in the form of a flow of air or water at low temperature having an overall thermal power Pfa.

With reference to FIG. 1, the co/trigeneration energy system comprises, in addition to the co-generator module 7, an electronic unit 15, which is designed to manage the thermal powers Ptsin, Ptc, Ptw, Pta and the electrical powers Pev, Pec and Pea, through a multi-objective function Fmo, described in detail hereinafter, in such a way as to maximize the overall energy efficiency of the energy plant 2 and reduce at the same time the energy costs of use of the energy plant 2 itself.

In particular, the electronic unit 15 is designed to receive at input: a first vector PTi containing the thermal powers Pb, Ptsin, Ptsout, Ptw and Pta; a second vector Oi containing the powers Pfa, Pfc, Pev, Pec, Pea, Ptc, Pec, Pec; and a third vector Ni containing a set of data regarding the energy efficiencies of the co/trigeneration energy system 4 and of the different energy sources 5 present in the energy plant 2.

In detail, the third vector Ni comprises: a parameter $\eta b$ designating the thermal efficiency of the boiler 10; a parameter $\eta tchp$ designating the thermal efficiency of the co/trigeneration energy system 4; and a parameter $\eta echp$ designating the electrical efficiency of the co/trigeneration energy system 4.

The electronic unit 15 is moreover designed to receive at input: a parameter $\eta fc$ designating the coefficient of performance COP of the waste-heat refrigeration devices 12; and a parameter $\eta pc$ designating the coefficient of performance of the integrative-cooling device 8.

The electronic unit 15 is moreover designed to receive at input a fourth vector Ci containing the costs of the fuel used by the co/trigeneration energy system 4 and/or by the integration boilers 10.

In the case in point, in the example illustrated the fourth vector Ci comprises: a parameter CCH4 representing the cost of the fuel, in particular non-defiscalized methane; and a parameter CCH4' representing the cost of the fuel, in particular in the case where there exists a specific tariff due, for example, to the defiscalization of the costs thereof.

The electronic unit 15 is moreover designed to receive at input a fifth vector Ai containing parameters associated to the prices of sale of the thermal/electrical energy to the loads 6.

In particular, the fifth vector Ai comprises: a parameter Afa designating the price of sale of the refrigerating thermal power Pfa; a parameter Afc designating the price of sale of the refrigerating thermal power Pfc; a parameter Aev designating the price of sale of the electrical power Pev transferred to the electric network 3 and/or carried to other energy plants 2; a parameter Aec designating the price of sale of the electrical power Pec yielded to the loads 6; a parameter Aea designating the price of sale of the electrical power Pea purchased by the electric network 3 and/or carried to other energy plants 2; a parameter Atc designating the price of sale of the thermal power Ptc sent to the loads 6; a parameter Aamm designating a cost of ammortization of the plant 2; and a parameter Aamb designating the environmental costs.

In regard to the foregoing description it is to be pointed out that the electronic unit 15 is consequently designed to receive at input the parameter Aamb and the following vectors/quantities:

PTi=(Pb, Ptsin, Ptc, Ptsout, Ptw, Pta)
Oi=(Pfa, Pfc, Pev, Pec, Pea, Ptc, Pec, Pec)
Ci=(CCH4, CCH4', CCH4', 0, CCH4', CCH4')
Ai=(Afa, Afc, Aev, Aec, Aea, Atc, −Aamn, −Aamb)
Ni=($\eta$b, $\eta$tchp, $\eta$echp, 1, $\eta$tchp, $\eta$chp)

and implements thereon the multi-objective function Fmo to supply, instant by instant, a output-power vector of the co-generator PUi regarding the electrical and thermal powers to be controlled, namely, PUi=(Ptsin, Ptc, Ptw, Pta, Pev, Pec, Pea).

Figure 2:
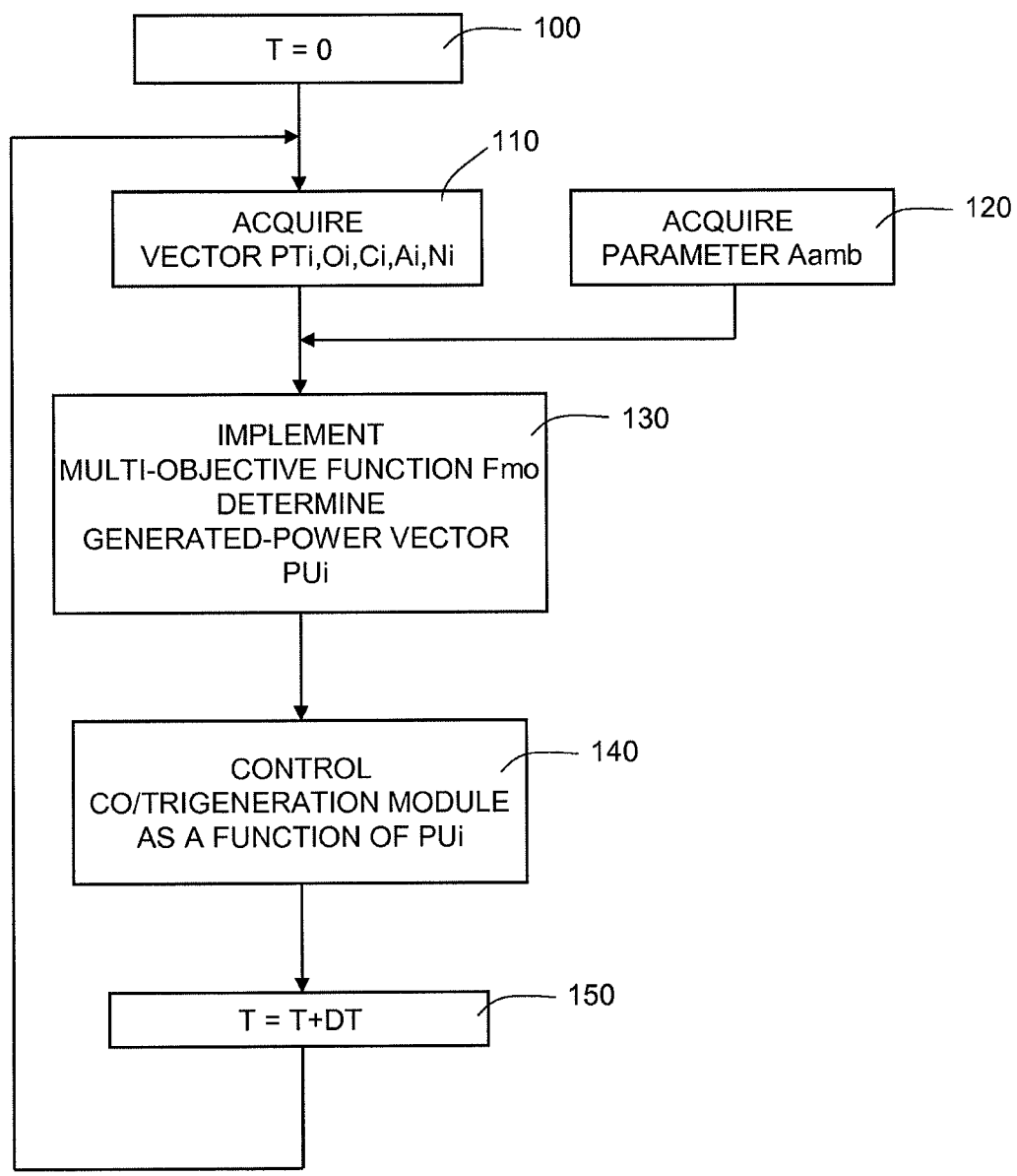
FIG. 2 shows a flowchart of the operations implemented by the method for multi-objective management of the electrical and thermal energy produced by a co/trigeneration energy system built according to the dictates of the present invention.

With reference to FIG. 2, there follows a description of the method for multi-objective management of the electrical and thermal energy implemented by the electronic unit 15, in which it is assumed that said two forms of energy are generated at output by a single co/trigeneration energy system 4 present in the energy plant 2.

Starting from an initial instant T=0, the electronic unit 15 implements the following steps: acquiring the parameters associated to the vectors PTi, Oi, Ci, Ai, and Ni (block 100), this step comprising the acquisition of the environmental costs Aamb associated to the gas emissions caused by the energy plant 2 itself into the external environment (block 120).

Following upon acquisition of the aforesaid vectors, the electronic unit 15 processes the parameters associated to the vectors PTi, Ci, Ci, Ai, and Ni through the multi-objective function Fmo (Ni, Ci, PTi, Ai, Oi) (block 130) in such a way as to determine therefrom the values of the parameters Ptsin, Ptc, Ptw, Pta, Pev, Pec, Pea of the co/trigenerator output-power vector PUi (Block 140).

In the case in point, the function Fmo (Ni, Ci, PTi, Ai, Oi) corresponds to the following function:

$$Fmo = \sum_i \frac{1}{Ni} * Ci * PTi \sum_i Ai * Oi$$

The electronic unit 15 moreover verifies the following constraints between the electrical and thermal powers:

$Pev+Pec+Pea=Pe$ $Pfa+Pfc=Pf$ $Pb+Pt\sin+Ptc+Ptsout+Ptw+Pta=Pt(1+1/\eta a)$ where:
Pe is the electrical-power demand of the loads 6;
Pf is the refrigerating-power demand of the loads 6; and
Pt is the thermal-power demand of the loads 6.

The electronic unit 15 moreover envisages determining the values of the vectors PUi that optimize the function Fmo. Said calculation for optimization envisages minimization of the function Fmo through a first, linear-optimization, algorithm, and/or a second, nonlinear-optimization, algorithm, and/or a third, stochastic-optimization, algorithm and/or by means of a combination of the first, second, and third algorithms. The techniques for linear optimization of a function are known and consequently will not be described any further.

Once the values of the parameters Ptsin, Ptc, Ptw, Pta, Pev, Pec, Pea of the output-power vector PUi have been determined, the electronic unit 15 drives the various electronic control modules (not illustrated) present in the co/trigeneration module 7 in such a way that the thermal or electrical powers supplied at output correspond to the powers Ptsin, Ptc, Ptw, Pta, Pev, Pec, Pea of the power vector PUi that have been calculated (block 140).

At this point, the method envisages integration of the sampling time T=T+dT (block 150) and again implements the operations described in blocks 110-150 so as to update repeatedly the powers of the power vector PUi.

The system described above affords the major advantage of maximizing the energy efficiency of one or more multi-source installations, reducing the costs of management thereof thanks to the control of the production as a function of the demand itself.

Finally, it is clear that modifications and variations can be made to the system and to the method described above, without thereby departing from the scope of the present invention defined by the annexed claims.

In particular, the system can envisage a central processing unit 40, which is set in a position that is remote with respect to each multi-source energy plant 2 and communicates with the co/trigeneration stations 4 through a bidirectional data-communication network 41.

The central processing unit 40 gathers the information on the basis of the sum of the electrical demands of the multi-source energy plants 2, using a second optimization function based upon a stochastic algorithm and sorts out a request for producing an electrical surplus with the purpose of guaranteeing the maximum profitability and/or possibly the best compromise between profitability and/or environmental costs and of absorbing from the network 3 a certain amount of energy.

Each multi-source energy plant 2, in the observance of the technical constraints, i.e., of the minimum and maximum power that can be supplied by the different cogeneration systems 4 and of quality of the service, i.e., the capacity to satisfy completely and without interruption the thermal-energy demand, and/or refrigerating demand, and/or local electrical demand of the loads 6, is able to manage the demand autonomously, communicating remotely to the central processing unit 40 a possible incapacity thereof to satisfy it.

In the case where the multi-source energy plant 2 is not able to meet the demands, the central processing unit 40 redefines the demands in regard to the other multi-source energy plants 2 through a recalculation of the multi-objective function Fmo described above.

The central processing unit 40 can manage any transfer of power from one multi-source energy plant 2 to another both on the basis of a physical model of the electrical distribution network 3, such as, for example, the network load-flow model, and on the basis of an economic model of the cost that is able to process, for example, the distance of two multi-source energy plants 2 or the amount of electrical energy to exchange between the two multi-source energy plants 2 themselves.

The invention claimed is:

1. A system for regulating electrical and thermal energy generated by at least one energy generation system in at least one multi-source energy plant provided to receive or supply electrical power from or to other multi-source energy plants through an electric network;

said at least one energy generation system being one of a cogeneration energy system and a trigeneration energy system;

said energy generation system comprising a generation module configured to be fed with a fuel flow and generate electrical and thermal power;

said multi-source energy plant comprising one or more auxiliary sources of at least one of electrical and thermal energy configured to exchange at least one of electrical power (Pev, Pec, Pea) and thermal power (Pb, Ptsin, Ptc, Ptsout, Ptw, Pta, Pfc) with said generation module and one or more loads comprising at least one of electrical and thermal apparatuses configured to receive and use at least one of said electrical power and thermal power supplied by at least one of said generation module, said auxiliary sources and said electric network;

said energy generation system further comprising an electronic unit provided to:
implement a pre-set multi-objective function (Fmo) comprising, for each multi-source energy plant, first computation parameters (PTi, Oi) including values of electrical and thermal powers exchanged within said multi-source plant between said generation module, said loads, said auxiliary sources and said electric network; and second (Ci, Ai) and third (Ni) computation parameters related to management costs and to efficiency of generation and exchange of electrical and thermal powers within said multi-source energy plant;
determine optimal values (PUi) of the electrical and thermal powers (Ptsin, Ptc, Ptw, Pta, Pev, Pec, Pea) that said energy generation system should output to minimize said multi-objective function (Fmo); and
vary the electrical and thermal powers (Ptsin, Ptc, Ptw, Pta, Pev, Pec, Pea) generated by said generation module as a function of said determined optimal values (PUi).

2. The system according to claim 1, wherein said auxiliary sources comprise:
one or more thermal boilers for generation of thermal energy (Eb), designed to supply to said energy generation system a first thermal power (Pb);
thermal-energy accumulator means, which are designed to receive from said energy generation system a second thermal power (Ptsin) and are designed to supply to said loads a third thermal power (Ptsout);
integrative-cooling means for supplying to said loads a fourth thermal power (Pfc);
refrigeration means for receiving from said generation module a fifth thermal power (Pta) and supplying to said loads a sixth thermal power (Pfa); and
wherein said energy generation system comprises heat-dissipator module, designed to receive a seventh thermal power (Ptw).

3. The system according to claim 2, wherein said multi-objective function (Fmo) corresponds to the following function (Fmo=f(Ni, Ci, PTi, Ai, Oi)); where:
PTi is a first vector containing a set of thermal powers (Pb, Ptsin, Ptc, Ptsout, Ptw, Pta) generated by said energy generation system and by said auxiliary sources;
Oi is a second vector containing electrical and thermal powers (Pfa, Pfc, Pev, Pec, Pea, Ptc, Pec, Pec) received from at least one of said loads and said network;
Ni is a third vector containing the efficiencies ($\eta b$, $\eta tchp$, $\eta echp$, 1, $\eta tchp$, $\eta tchp$) of said energy generation system and of said auxiliary sources;
Ci is a fourth vector containing costs of fuel used by at least one of said energy generation system and said one or more thermal boilers; and
Ai is a sixth vector containing parameters (Afa, Afc, Aev, Aec, Aea, Atc, -Aamn, -Aamb) associated to at least one of prices of sale of at least one of the thermal and electrical energy to said loads, costs of amortization of said multi-source energy plant and environmental costs.

4. The system according to claim 3, wherein said multi-objective function (Fmo) corresponds to the following function:

$$Fmo = \sum_i \frac{1}{Ni} * Ci * PTi - \sum_i Ai * Oi.$$

5. The system according to claim 4, wherein said multi-objective function (Fmo) must satisfy the following constraints between the electrical and thermal powers:

$$Pev+Pec+Pea=Pe$$

$$Pfa+Pfc=Pf$$

$$Pb+Pt\sin+Ptc+Ptsout+Ptw+Pta=Pt(1+1/\eta a)$$

where:
Pe is the electrical-power demand of said loads;
Pev is a first electrical power;
Pec is a second electrical power;
Pea is a third electrical power;
Ptc is an eighth thermal power;
$\eta a$ is a parameter related to an efficiency of said at least one energy generation system;
Pf is the refrigerating-power demand of said loads;
Pt is the thermal-power demand of said loads.

6. The system according to claim 1, wherein said electronic unit is provided to determine optimal values (PUi) of said electrical and thermal powers (Ptsin, Ptc, Ptw, Pta, Pev, Pec, Pea) through an algorithm for optimization of said multi-objective function (Fmo); said optimization algorithm comprising at least one of a first linear-optimization algorithm, a second nonlinear-optimization algorithm, a third stochastic-optimization algorithm and a combination of said first, second, and third algorithms.

7. The system according to claim 1, comprising a plurality of energy generation systems each being one of a cogeneration energy system and a trigeneration energy system, wherein said electronic unit is installed in each of said energy generation systems.

8. The system according to claim 1, wherein said electronic unit is installed in a remote unit communicating with said at least one energy generation system.

9. A method of regulating electrical and thermal energy generated by at least one energy system in at least one multi-source energy plant provided to receive or supply electrical power from or to other multi-source energy plants through an electric network;
said at least one energy system being one of a cogeneration energy system and a trigeneration energy system;
said energy system comprising generation module configured to be fed with a fuel flow and generate electrical and thermal power;
said multi-source energy plant comprising one or more auxiliary sources of at least one of thermal and electrical energy configured to exchange at least one of electrical power (Pev, Pec, Pea) and thermal power (Pb, Ptsin, Ptc, Ptsout, Ptw, Pta, Pfc) with said generation module and one or more loads comprising at least one of electrical and thermal apparatuses configured to receive and use at least one of said electrical power and thermal power supplied by at least one of said generation module, said auxiliary sources and said electric network;

said method comprising the steps of:
  implementing a pre-set multi-objective function (Fmo) comprising, for each multi-source energy plant, first computation parameters (PTi, Oi) including values of electrical and thermal powers exchanged within said multi-source plant between said generation module, said loads, said auxiliary sources and said electric network; and second (Ci, Ai) and third (Ni) computation parameters related to management costs and to efficiency of generation and exchange of electrical and thermal powers within said multi-source energy plant;
  determining optimal values (PUi) of the electrical and thermal powers (Ptsin, Ptc, Ptw, Pta, Pev, Pec, Pea) that said energy system should output to minimize said multi-objective function (Fmo); and
  varying the electrical and thermal powers (Ptsin, Ptc, Ptw, Pta, Pev, Pec, Pea) generated by said generation module as a function of said determined optimal values (PUi).

10. The method according to claim 9, wherein said auxiliary sources comprise:
  one or more thermal boilers for generation of thermal energy (Eb), designed to supply to said energy system a first thermal power (Pb);
  thermal-energy accumulator means, which are designed to receive from said energy system a second thermal power (Ptsin) and are designed to supply to said loads a third thermal power (Ptsout);
  integrative-cooling means for supplying to said loads a fourth thermal power (Pfc); and
  refrigeration means for receiving from said generation module a fifth thermal power (Pta) and supplying to said loads a sixth thermal power (Pfa); and wherein said cogeneration energy system comprises heat-dissipator module, designed to receive a seventh thermal power (Ptw).

11. The method according to claim 10, wherein said multi-objective function (Fmo) corresponds to the following function (Fmo=f(Ni, Ci, PTi, Ai, Oi)), where:
  PTi is a first vector containing a set of thermal powers (Pb, Ptsin, Ptc, Ptsout, Ptw, Pta) generated by said energy system and by said auxiliary sources;
  Oi is a second vector containing electrical and thermal powers (Pfa, Pfc, Pev, Pec, Pea, Ptc, Pec, Pec) received by at least one of said loads and said network;
  Ni is a third vector containing the efficiencies ($\eta b$, $\eta tchp$, $\eta echp$, 1, $\eta tchp$, $\eta tchp$) of said energy system, and of the auxiliary sources;
  Ci is a fourth vector containing costs of fuel used by at least one of said energy system and said one or more thermal boilers; and
  Ai is a sixth vector containing parameters (Afa, Afc, Aev, Aec, Aea, Atc, -Aamn, -Aamb), associated to at least one of prices of sale of at least one of the thermal and electrical energy to the loads, costs of amortization of said multi-source energy plant and environmental costs.

12. The method according to claim 11, wherein said multi-objective function Fmo corresponds to the following function:

$$Fmo = \sum_i \frac{1}{Ni} * Ci * PTi \sum_i Ai * Oi.$$

13. The method according to claim 12, wherein said multi-objective function (Fmo) must satisfy the following constraints between the electrical and thermal powers:

$Pev+Pec+Pea=Pe$ $Pfa+Pfc=Pf$ $Pb+Pt\sin+Ptc+Ptsout+Ptw+Pta=Pt(1+1/\eta a)$ where:
  Pe is the electrical-power demand of said loads;
  Pev is a first electrical power;
  Pec is a second electrical power;
  Pea is a third electrical power;
  Ptc is an eighth thermal power;
  $\eta a$ is a parameter related to an efficiency of said at least one energy system;
  Pf is the refrigerating-power demand of said loads;
  Pt is the thermal-power demand of said loads.

14. The method according to claim 9, further comprising the step of determining optimal values (PUi) of the electrical and thermal powers (Ptsin, Ptc, Ptw, Pta, Pev, Pec, Pea) through an algorithm of minimization of said multi-objective function (Fmo); said minimization algorithm comprising at least one of a first linear-optimization algorithm, a second nonlinear-optimization algorithm, a third stochastic-optimization algorithm and a combination of said first, second, and third algorithms.

15. A non-transitory computer-readable medium on which is encoded computer-executable program code, the program code being loadable into a memory of an electronic computing unit and provided to implement the method of claim 9 when run by a computer.

* * * * *